US009141918B2

(12) United States Patent
Rosso et al.

(10) Patent No.: US 9,141,918 B2
(45) Date of Patent: Sep. 22, 2015

(54) USER CONTRIBUTION BASED MAPPING SYSTEM AND METHOD

(75) Inventors: Vincent Rosso, San Francisco, CA (US);
Tasos Roumeliotis, Orinda, CA (US);
Scott Hotes, Berkeley, CA (US); Daniel Hodges, San Francisco, CA (US); Joel Grossman, San Francisco, CA (US);
Jason Finkelstein, San Francisco, CA (US)

(73) Assignee: Location Labs, Inc., Emeryville, CA (US)

( * ) Notice: Subject to any disclaimer, the term of this patent is extended or adjusted under 35 U.S.C. 154(b) by 734 days.

(21) Appl. No.: 13/219,669

(22) Filed: Aug. 27, 2011

(65) Prior Publication Data
US 2012/0135756 A1 May 31, 2012

Related U.S. Application Data

(63) Continuation-in-part of application No. 12/406,917, filed on Mar. 18, 2009, now Pat. No. 8,073,907.

(60) Provisional application No. 61/377,862, filed on Aug. 27, 2010.

(51) Int. Cl.
*G06F 15/16* (2006.01)
*G06Q 10/04* (2012.01)
*G01S 5/00* (2006.01)
*G01S 19/39* (2010.01)
*G06F 17/30* (2006.01)

(52) U.S. Cl.
CPC ............ *G06Q 10/047* (2013.01); *G01S 5/0027* (2013.01); *G01S 19/39* (2013.01); *G06F 17/3087* (2013.01)

(58) Field of Classification Search
CPC ... G06F 17/3087; G01S 19/39; G01S 5/0027; G06Q 10/047
USPC ............................. 709/204; 455/456.1–456.3
See application file for complete search history.

(56) References Cited

U.S. PATENT DOCUMENTS

| 5,833,479 | A  | 11/1998 | Talbot |
| 6,243,039 | B1 | 6/2001  | Elliot |
| 6,437,696 | B1 | 8/2002  | Lemelson et al. |
| 6,701,234 | B1 | 3/2004  | Vogelsang et al. |
| 6,813,502 | B2 | 11/2004 | Son et al. |
| 6,816,720 | B2 | 11/2004 | Hussain et al. |
| 6,834,195 | B2 | 12/2004 | Brandenberg et al. |
| 6,873,850 | B2 | 3/2005  | Dowling et al. |

(Continued)

OTHER PUBLICATIONS

Streetadvisor.com, publication date unknown (access date Jun. 18, 2008).

(Continued)

*Primary Examiner* — Hee Soo Kim
(74) *Attorney, Agent, or Firm* — Dovas Law, P.C.

(57) ABSTRACT

A computer-implemented user contribution method is provided. The method includes retrieving event data posted by a plurality of users related to a first user, the event data including indications of at least one geographic area. The event data is compared with predetermined trigger data. A quality value of the at least one geographic area is determined based on the comparison of the event data with predetermined trigger data, and an indication of the quality value of the at least one geographic area is transmitted to a second user. A user contribution based mapping system is further provided.

33 Claims, 8 Drawing Sheets

(56) References Cited

U.S. PATENT DOCUMENTS

| | | |
|---|---|---|
| 6,885,874 B2 | 4/2005 | Grube et al. |
| 6,895,238 B2 | 5/2005 | Newell et al. |
| 6,961,562 B2 | 11/2005 | Ross |
| 6,985,696 B2 | 1/2006 | Bromham et al. |
| 7,248,961 B2 | 7/2007 | Park et al. |
| 7,593,740 B2 | 9/2009 | Crowley et al. |
| 7,606,772 B2 | 10/2009 | Flinn et al. |
| 7,881,864 B2 | 2/2011 | Smith |
| 8,073,907 B2 | 12/2011 | Roumeliotis et al. |
| 8,145,240 B2 | 3/2012 | Roumeliotis et al. |
| 8,229,421 B2 | 7/2012 | Hotes et al. |
| 8,244,236 B2 | 8/2012 | Roumeliotis et al. |
| 8,412,647 B2 | 4/2013 | Hotes et al. |
| 8,428,623 B2 | 4/2013 | Roumeliotis et al. |
| 8,447,810 B2 | 5/2013 | Roumeliotis et al. |
| 2002/0116266 A1 | 8/2002 | Marshall |
| 2003/0216960 A1 | 11/2003 | Porstrel |
| 2004/0122734 A1 | 6/2004 | Schleicher et al. |
| 2004/0214584 A1 | 10/2004 | Marinier |
| 2005/0195193 A1 | 9/2005 | Lehman |
| 2005/0282559 A1 | 12/2005 | Erskine et al. |
| 2006/0009234 A1 | 1/2006 | Freer |
| 2006/0089878 A1 | 4/2006 | Roberts et al. |
| 2006/0135120 A1 | 6/2006 | Likourezos |
| 2006/0200435 A1 | 9/2006 | Flinn et al. |
| 2006/0270421 A1* | 11/2006 | Phillips et al. ............... 455/457 |
| 2007/0100595 A1 | 5/2007 | Earles |
| 2007/0142068 A1 | 6/2007 | Matsuo |
| 2007/0218900 A1 | 9/2007 | Abhyanker |
| 2007/0273558 A1 | 11/2007 | Smith et al. |
| 2007/0282678 A1 | 12/2007 | Dendi et al. |
| 2008/0018453 A1 | 1/2008 | Adler |
| 2008/0027634 A1 | 1/2008 | Obradovich et al. |
| 2008/0071749 A1 | 3/2008 | Schloter |
| 2008/0077489 A1 | 3/2008 | Gilley et al. |
| 2008/0119207 A1 | 5/2008 | Harris |
| 2008/0146250 A1* | 6/2008 | Aaron ..................... 455/456.3 |
| 2008/0153511 A1 | 6/2008 | Mock |
| 2010/0241496 A1 | 9/2010 | Gupta et al. |
| 2012/0077523 A1 | 3/2012 | Roumeliotis et al. |
| 2012/0202528 A1 | 8/2012 | Roumeliotis et al. |

OTHER PUBLICATIONS

Office Action dated Oct. 11, 2011 for U.S. Appl. No. 12/406,774.
Office Action dated Jun. 22, 2012 for U.S. Appl. No. 13/429,358.
Office Action dated Mar. 30, 2011 for U.S. Appl. No. 12/406,917.
Office Action dated Mar. 15, 2012 for U.S. Appl. No. 13/310,768.
Office Action dated Jul. 19, 2012 for U.S. Appl. No. 12/611,109.

* cited by examiner

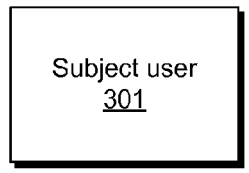 Tier 1, Weight = 20
 Tier 2, Weight = 10
 Tier 3, Weight = 7
FIG. 6
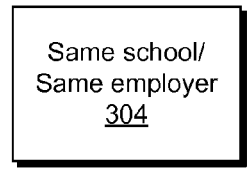 Tier 4, Weight = 5
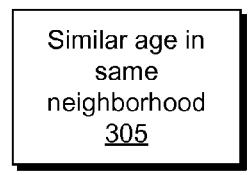 Tier 5, Weight = 3
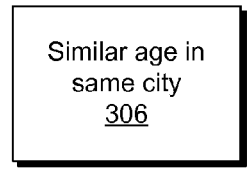 Tier 6, Weight = 1

USER CONTRIBUTION BASED MAPPING SYSTEM AND METHOD

CROSS REFERENCE TO RELATED APPLICATION(S)

This application is a continuation-in-part of U.S. application Ser. No. 12/406,917, filed Mar. 18, 2009. This application further claims the benefit of U.S. Provisional Application No. 61/377,862, filed Aug. 27, 2010. Application Ser. No. 12/406,917 and 61/377,862 are incorporated by reference as if fully set forth.

BACKGROUND

As increasingly unfettered mobility has become a normal part of modern life, people frequently desire to determine a quality of a particular travel destination. They may want to know typical traffic conditions of a particular road, whether a particular neighborhood is safe and accommodating to children, or whether a particular area is more residential or commercial in nature. Someone may desire this information for their own direct benefit, or alternatively, for use in supervising travel of others who they are responsible for, such as their children or employees. Teachers or parents may require that children for whom they are responsible avoid certain locations or adhere to certain predefined routes on their way to and from school or other destinations. Employers, in an effort to enhance worker productivity, may wish to enforce schedules defining where employees should be at particular times during the work day.

Locatable mobile devices such as mobile telephones, cellular-enabled personal computers and GPS systems provide reliable means to determine the location of a user. It would be desirable to provide effective methods for determining a quality of a particular geographic area and for establishing and maintaining mobility control over a user of a locatable mobile device.

SUMMARY

The present invention provides a computer implemented user contribution method. The method includes receiving identifying information from a plurality of users and receiving from the plurality of users indications of one or more geographic areas. A quality value of the one or more geographic areas is determined based on the indications of one or more geographic areas from the plurality of users, and the quality value is transmitted to one or more of the plurality of users.

The present invention further provides a user contribution based mapping system including a computing device with a memory having instructions operable to enable the computing device to perform a procedure. The procedure includes receiving identifying information from at least a first user and a second user and receiving from at least the first user and the second user indications of at least one geographic area. The procedure further includes determining a quality value of the at least one geographic area based on the indications of the at least one geographic area and transmitting the quality value to a third user.

The present invention further provides a computer-implemented user contribution method including retrieving event data posted by a plurality of users related to a first user, the event data including indications of at least one geographic area. The event data is compared with predetermined trigger data. A quality value of the at least one geographic area is determined based on the comparison of the event data with predetermined trigger data, and an indication of the quality value of the at least one geographic area is transmitted to a second user.

The present invention further provides a user contribution based mapping system comprising at least one computing device including at least one memory with instructions operable to enable the computing device to perform a procedure. The procedure includes retrieving event data posted by a plurality of users related to a first user, the event data including indications of at least one geographic area. Identifying information of the plurality of users is retrieved, the identifying information including indications of relationship statuses between the first user and the plurality of users. The event data is compared with predetermined trigger data. A quality value of the at least one geographic area is determined based on the comparison of the event data with predetermined trigger data and based on the relationship status between the first user and at least one of the plurality of users, and an indication of the quality value of the at least one geographic area is transmitted to a second user.

BRIEF DESCRIPTION OF THE DRAWING(S)

The foregoing Summary as well as the following detailed description will be readily understood in conjunction with the appended drawings which illustrate preferred embodiments of the invention. In the drawings:

FIG. 6 shows an example user relationship status weighting list according to a preferred embodiment of the invention.

DETAILED DESCRIPTION OF THE PREFERRED EMBODIMENT(S)

Figure 1:
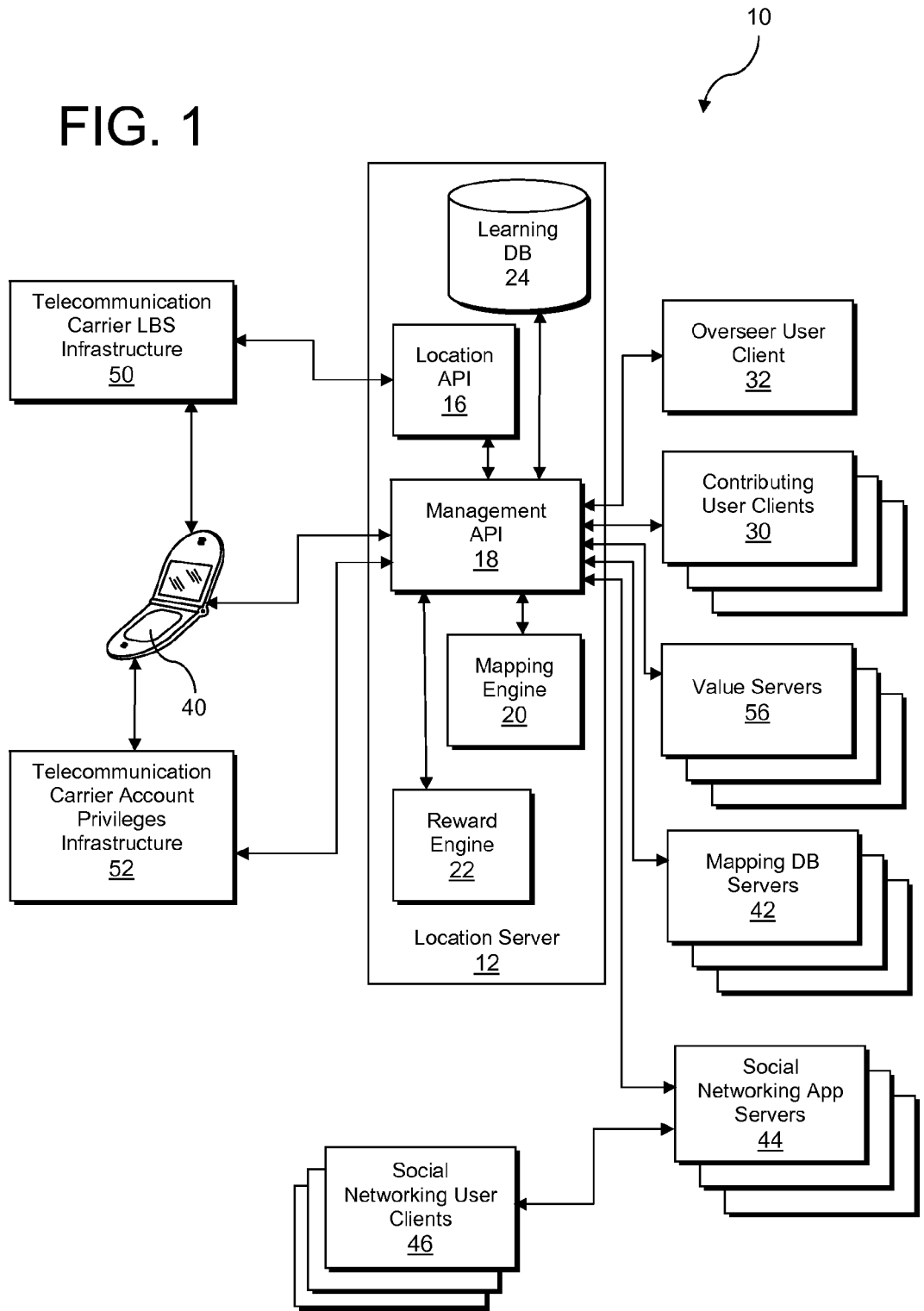
FIG. 1 is a schematic illustration of an exemplary operating environment in which a user contribution based mapping system is operable according to a preferred embodiment of the present invention.

Certain terminology is used in the following description for convenience only and is not limiting. The words "a" and "one" are defined as including one or more of the referenced item unless specifically stated otherwise. This terminology includes the words above specifically mentioned, derivatives thereof, and words of similar import. The phrase "at least one" followed by a list of two or more items, such as A, B, or C, means any individual one of A, B or C as well as any combination thereof.

The preferred embodiments of the present invention are described below with reference to the drawing figures where like numerals represent like elements throughout.

Referring to FIG. 1, a schematic illustration is shown of an exemplary operating environment 10 in which a preferred system for implementing user contribution based mapping in the form of a location server 12 may be used. The location server 12 includes one or more computing devices and one or more memory devices, which computing devices and memory devices may be integrally constructed or connected in any suitable manner, for example via a network. The location server 12 provides a platform which enables a location application program interface (API) 16, a management API 18, a mapping engine 20, and a rewards engine 22.

The management API 18 is configured to receive identifying information from a plurality of contributing users through respective contributing user clients 30, such as personal computers, mobile telephone devices, or global positioning system (GPS) enabled devices, via a network connection, which network connection is preferably an Internet network connection. The identifying information of each user preferably includes a plurality of user identifying criteria including one or more of a user address, a user age, a user gender, and a user occupation. Alternatively, the identifying information can include any suitable user identifying criteria. The management API 18 is preferably configured to establish a plurality of contributing user accounts using the identifying information of the contributing users.

The management API 18 is further configured to receive from each of the plurality of contributing users via respective contributing user clients 30 an indication of one or more geographic areas. The indication of one or more geographic areas preferably includes one or more geographic areas and a rating of the one or more geographic areas. The one or more geographic areas may be designated by a user as an address, a plurality of addresses, a road or street, a plurality of roads or streets bounding an area, one or more neighborhoods or landmarks, or an area surrounding or in proximity to an address, a neighborhood or a landmark. The rating may include an indication that the one or more geographic areas are residential or commercial. The rating may alternatively include an indication of a perceived or actual level of safety of the one or more geographic areas. The rating is preferably received through the management API 18 as a scaled numeric indication within a predetermined range. For example, a contributing user may rate a particular area on a numeric scale from 1 to 5 for perceived safety, perceived concentration of residences, perceived concentration of commercial establishments, perceived vehicular congestion, or perceived availability of sidewalks.

The mapping engine 20 is configured to determine a quality value of the one or more geographic areas based on the indication of the one or more geographic areas from the plurality of contributing users. Preferably the quality value is determined as an average of the ratings received from the plurality of contributing users for an indicated geographic area. For example, if for a particular geographic area the management API 18 receives ratings from three different contributing users, the mapping engine 20 can average the ratings of the three users to generate a quality value for the particular geographic area. The mapping engine 20 preferably generates a map including one or more geographic areas and the determined quality values associated with each of the one or more geographic areas based on the indications received from a plurality of contributing users. The quality value of the one or more geographic areas is transmitted, preferably in the form of a map, via the management API 18 to one or more of the plurality of contributing users. The one or more of the plurality of users to whom a quality value of a particular geographic area is transmitted need not to have provided an indication of the particular geographic area for which the quality value is determined, but may have provided an indication of another geographic area. The quality value of the one or more geographic areas may further be transmitted to a user who did not contribute any indication of a geographic area. In such manner a user may benefit from the impressions of other users regarding a particular geographic area.

The mapping engine 20 preferably further determines the quality value based on the plurality of user identifying criteria received from each of the plurality of contributing users. The management API 18 is configured to receive an indication of one or more preferred user identifying criteria from a user who desires to receive a quality value for one or more geographic areas. The mapping engine 20 can thereafter determine the quality value of the one or more geographic areas based on the indication of the one or more geographic areas received from those of the plurality of users corresponding to the one or more preferred identifying criteria. For example, an indication of a preferred user identifying criterion received from a user may include a preferred user age group of 16-24 years in age. In such example, the mapping engine 20 uses the indication of one or more geographic areas received from ones of the plurality of users corresponding to the age group of 16-24 years to determine the quality value. In another example, an indication of a preferred identifying criterion may include a designated neighborhood, wherein the mapping engine 20 uses the indication of one or more geographic areas received from ones of the plurality of users living in the designated neighborhood to determine the quality value.

The management API 18 is preferably further configured to establish an overseer user account using identifying information of an overseeing user, and a subject user account using identifying information of a subject user, associated with a subject user mobile device 40, whom the overseeing user desires to track. The location server 12 is configured to receive the identifying information of the overseeing user and subject user through the management API 18 from an overseer user client 32 operated by the overseeing user, such as a personal computer, mobile telephone device, or global positioning system (GPS) enabled device, via a network connection, which network connection is preferably an Internet network connection. As set forth in this description, an overseeing user may include a person, for example a parent, guardian, or employer of a subject user. Alternatively, the overseeing user may include a non-person, for example a computing device configured to implement oversight requirements of a parent, guardian or employer of a subject user, or configured to enforce rules of a game in which a subject user is participating. The overseeing user is preferably a contributing user, and accordingly, the overseer user client 32 and contributing user client 30 are preferably a single user client. Alternatively, the overseeing user need not be a contributing user.

The received identifying information of the subject user and overseeing user may be personal and/or specific to a mobile device used by the subject user or overseer user. The received subject user identifying information preferably includes one or more of the name of the subject user, a telephone number associated with the subject user mobile device 40, a telecommunication carrier identifier, for example an account number, associated with the subject user mobile device 40 used to establish a connection with a telecommunication carrier providing service for the subject user mobile device 40, and a device-specific identifier of the subject user mobile device 40. A device-specific identifier, such as a MAC address, is required for embodiments of the invention in which the subject user mobile device 40 is not associated with any telecommunication carrier, for example a stand-alone GPS device not requiring telecommunication carrier service. Similarly, the received overseeing user identifying information preferably includes one or more of the name of the overseer user, a telephone number associated with a mobile device used by the overseer user, a telecommunication carrier identifier, and a device-specific identifier of an overseer user's mobile device.

The management API 18 preferably provides an interface to the overseer user through a client application running on the overseer user client 32, an interface to the contributing user through a client application running on the contributing user client 30, and an interface to the subject user through a client application running on the subject user mobile device 40. Alternatively, the overseer user client 32 and contributing user client 30 may be provided as a single user client running one or more client applications. The client application or applications preferably include a web client application, WAP client application, short message service (SMS) application, interactive voice response (IVR) application or other suitable client application, which client applications may include firmware or software downloadable to the subject user mobile device 40, the overseer user client 32, or the contributing user client 30.

As indicated above, the mapping engine 20 preferably generates a map including one or more geographic areas and the quality values associated with each of the one or more geographic areas. A quality value can be generated based on one or more preferred contributing user identifying criteria provided by the overseeing user through the overseer user client 32. The map which includes one or more geographic areas and quality values associated with each of the one or more geographic areas is transmitted to the overseer user client 32 via the management API 18.

The location server 12 is further configured to receive via the management API 18 an indication of one or more geographic areas from the overseer user client 32, the one or more geographic areas preferably corresponding to areas which the subject user is permitted to travel or not permitted to travel by the overseeing user. The location server 12 is preferably configured to receive information including one or more rules sets from the overseer user client 32 defining the desired behavior of the subject user with respect to the one or more geographic areas and providing indications of periods of time when the desired behaviors are applicable to the travel of the subject user. The location server 12 is further configured to transmit information to the subject user mobile device 40, including the geographic areas, rules sets, and periods of time, to provide the subject user with notification of the required travel behaviors.

The indication of one or more geographic areas received from the overseer user client 32 by the location server 12 preferably includes an indication of a predetermined range of the quality value, which quality value as described above is determined based on the indications of one or more geographic areas received from the plurality of contributing users through the contributing user clients 30. The indication of one or more geographic areas received from the overseer user client 32 preferably further includes an indication of whether the geographic areas corresponding to quality values within the predetermined range correspond to areas within which the subject user is allowed to travel or not allowed to travel. For example, if a quality value is generated on a scale of 1 to 5 by the mapping engine 20 based on indications from contributing users, an overseeing user may provide to the location server 12 an indication of a predetermined range of 4 to 5 and designate geographic areas having quality values determined to be within the predetermined range of 4 to 5 as not allowable for a subject user to travel within.

The indication of the predetermined range is stored in a database configured via the mapping engine 20. Preferably, the quality values of the one or more geographic areas are compared with the predetermined range to determine whether the quality values fall within the predetermined range. The location server 12 is preferably configured to receive via the location API 16 location information of the subject user mobile device 40 from a location based service (LBS) infrastructure 50 of a telecommunication carrier providing telecommunication service to the subject user mobile device 40. The LBS infrastructure 50 preferably receives the location information or data required to generate the location information from the subject user mobile device 40. Alternatively, the location server 12 may receive location information of the subject user mobile device 40 directly from the subject user mobile device 40, especially in instances where the mobile device 40 is a stand-alone device. Alternatively, the location server 12 may receive location information from any suitable source in contact with the subject user mobile device 40. Preferably, the LBS infrastructure 50 or subject user mobile device 40 transmits location information to the location server 12 in the form of latitude and longitude of the subject user mobile device 40, which latitude and longitude may be determined via known methods such as tower-based or satellite (GPS) triangulation.

At the option of an overseeing user, if the location information received via the location API 16 indicates that the subject user mobile device 40 has entered a geographic area corresponding to a quality value falling within the predetermined range, an indication is transmitted to the overseeing user through the overseer user client 32 via the management API 18 notifying the overseeing user of the position of the subject user mobile device 40. Alternatively at the option of an overseeing user, an indication is transmitted to the overseeing user if the location information indicates that the subject user mobile device 40 has exited a geographic area corresponding to a quality value falling within the predetermined range. Alternatively at the option of an overseeing user, an indication is transmitted to the overseeing user if the location information indicates that the subject user mobile device 40 has failed to enter or exit a geographic area corresponding to a quality value falling within the predetermined range. Moreover, at the option of an overseeing user, a warning is transmitted to the subject user mobile device 40 via the management API 18 if the location information indicates that the subject user mobile device 40 has entered or exited, or failed to enter or exit, a geographic area corresponding to a quality value falling within the predetermined range. Preferably, a map is transmitted to the subject user mobile device 40 via the management API 18 displaying the one or more geographic areas and displaying in a suitable manner whether the quality value of the one or more geographic areas falls within the predetermined range provided by the overseeing user. The map transmitted to the subject user mobile device 40 preferably indicates whether the one or more geographic areas are designated by the overseer user as allowable or not allowable for travel by the subject user based on whether the quality value of the one or more geographic areas falls within the predetermined range. Accordingly, an overseeing user through the overseer user client 32 can communicate a desire to the subject user through the subject user mobile device 40 via the management API 18 that the subject user is not permitted to enter or not permitted to leave a geographic area corresponding to a quality value falling within the predetermined range.

The management API 18 is further configured to transmit an instruction to the reward engine 22 to generate an indication of a reward if the location information indicates that the subject user mobile device 40 has entered or exited, or failed to enter or exit, depending on preference of an overseeing user, a geographic area corresponding to a quality value falling within the predetermined range. The indication of a reward preferably includes an indication of permissions granted to or revoked from the subject user. Granted or revoked permissions preferably include modifications to the indication of the predetermined range of the quality value or changes in communication permissions, for example increases or decreases in a number of permitted sent or received SMS messages, or duration of telephone calls made by the subject user mobile device 40. Coinciding with transmitting indications of communication permissions granted to or revoked from the subject user, the management API 18 preferably transmits instructions to a communications infrastructure 52 of a telecommunications carrier to implement changes in communication permissions associated with the subject user mobile device 40 consistent with the indication of a reward. The indication of a reward may alternatively include digital goods awarded to the subject user such as mobile device ringtones and application content, or indications of redeemable value such as a coupons or gift certificate codes which may be redeemed at predetermined establishments, for example online or physical stores. The reward engine 22 may be configured to automatically generate and transmit through the management API 18 digital goods or indications of redeemable value to the subject user mobile device 40, or alternatively, the management API 18 may request and receive digital goods or indications of redeemable value from one or more remote value servers 56 configured to generate and transmit digital goods or indications of redeemable value.

The location server 12 via the management API 18 may alternatively transmit an indication to a remote value server 56 to transmit value from or to a first account associated with the overseer user to or from a second account associated with the subject user if the location information indicates that the subject user mobile device 40 has entered or exited, or failed to enter or exit, depending on preferences of an overseeing user, a geographic area corresponding to a quality value falling within the predetermined range. The remote value server 56 in such instance may include a banking server of a bank, or alternatively, a server of another monetary or non-monetary value managing entity, for example a server managing store credit, store coupon distribution, or digital goods distribution. The indication of a reward transmitted to the subject user mobile device 40 may include an indication of value transferred from or to the account associated with the subject user or an indication of redeemable value such as a coupon or gift certificate code.

Figure 2:
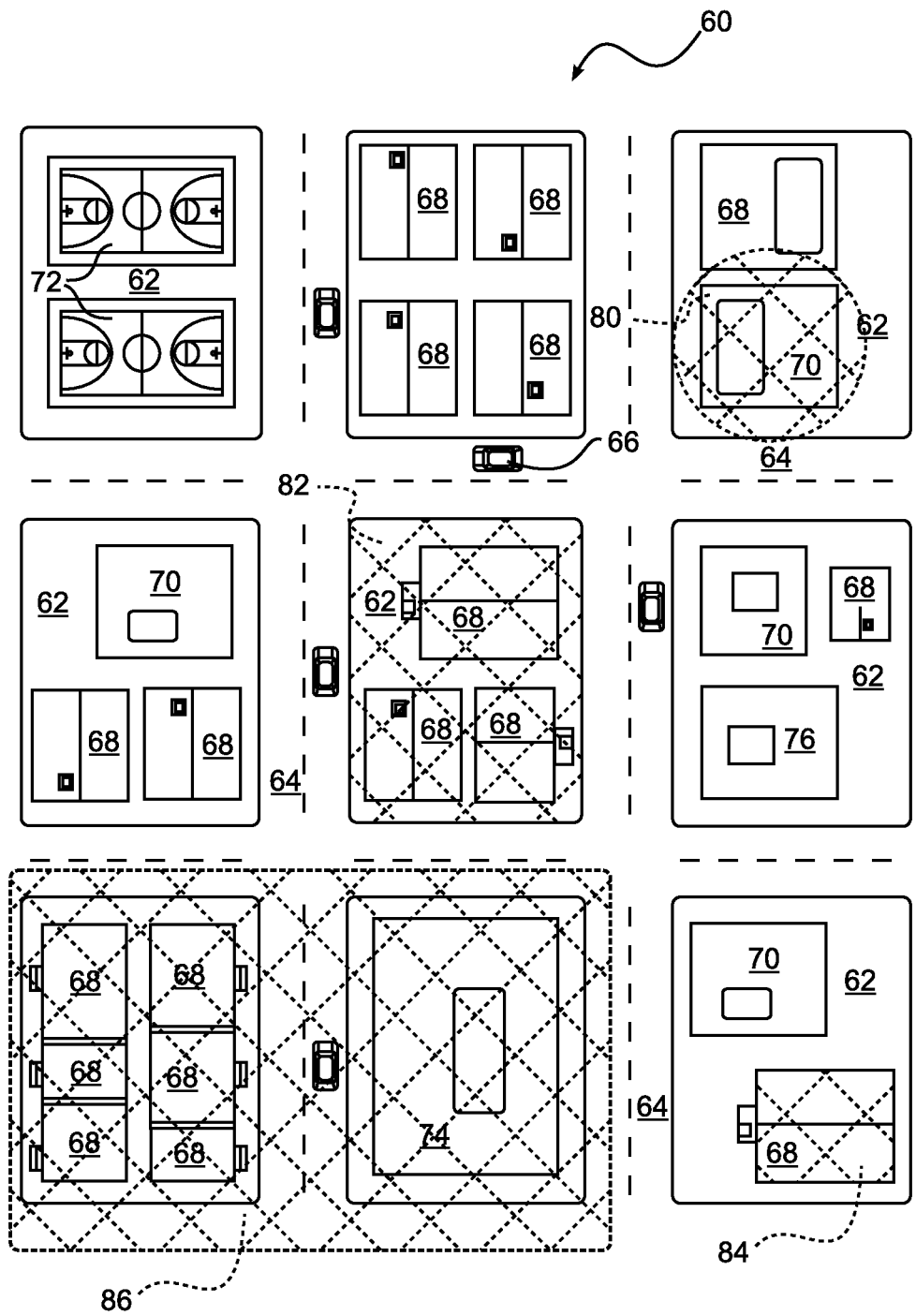
FIGS. 2-3 are plan views of an example city streetscape in which the preferred system of FIG. 1 is implemented.

Referring to FIG. 2, a plan view is shown of an example city streetscape 60 in which the system including the location server 12 is implemented. The streetscape 60 includes city blocks 62 separated by streets 64 permitting travel of vehicles 66. Various structures are provided on the city blocks 62 including homes 68, commercial establishments 70, playgrounds 72, a school 74, and a library 76. In this example, the location server 12 receives from a plurality of users through the management API 18 indications of geographic areas 80, 82, 84, 86 including ratings. The geographic areas 80, 82, 84, 86 correspond respectively to a commercial establishment 70, a city block 62, a home 68, and a neighborhood including homes 68 and a school 74. The indications of the geographic areas 80, 82, 84, 86 are preferably received from the contributing user clients 32 as an indication of an address, a rating for the address, and a manner of associating a geographic area with the address, wherein the management API 18 provides the contributing user clients 32 with a plurality of predetermined selectable manners of associating a geographic area with a rated address.

A first preferred user-selectable manner in which a geographic area is to be associated with a rated address includes defining the geographic area by a radius extending from an approximate center of a rated address, as shown for example by the first geographic area 80, which is a circular area having center at an approximate center of the property of the underlying commercial establishment 70. A second preferred user-selectable manner in which a geographic area is to be associated with a rated address includes defining an area by a perimeter of a block 62 on which the rated address is located, as shown for example by the second geographic area 82. A third preferred user-selectable manner in which an area is to be associated with a rated address includes defining an area by a perimeter of a property corresponding to the entered address or a structure on the property, as shown for example by the third geographic area 84. A fourth preferred user-selectable manner in which an area is to be associated with a rated address includes defining an area by a predetermined neighborhood boundary within which the address is located, as shown for example by the fourth geographic area 86. In addition to receiving indications of geographic areas through designation of addresses, the indications of the geographic areas may be received as rated streets, neighborhoods, cities or any suitably definable region. The mapping engine 20 is preferably configured to use stored streetscape data to generate a geographic area based on the rated address and the selected manner in which a geographic area is to be associated with the rated address.

The mapping engine 20 determines a quality value for each of the geographic areas 80, 82, 84, 86 based on ratings for those geographic areas received from a plurality of contributing users through the contributing user clients 30. The mapping engine 20 is preferably further configured to determine a quality value for a particular geographic area based on ratings received from contributing users which correspond to a plurality of dissimilar geographic areas. For example, if one contributing user provides a rating for the school 74, another contributing user provides a rating for a street 64 adjacent to the school 74, and another contributing user provides a rating for the neighborhood 86 in which the school 74 is located, the mapping engine 20 may use the three ratings, preferably using a suitable weighted averaging technique, to determine the quality value for the neighborhood 86.

Figure 3:
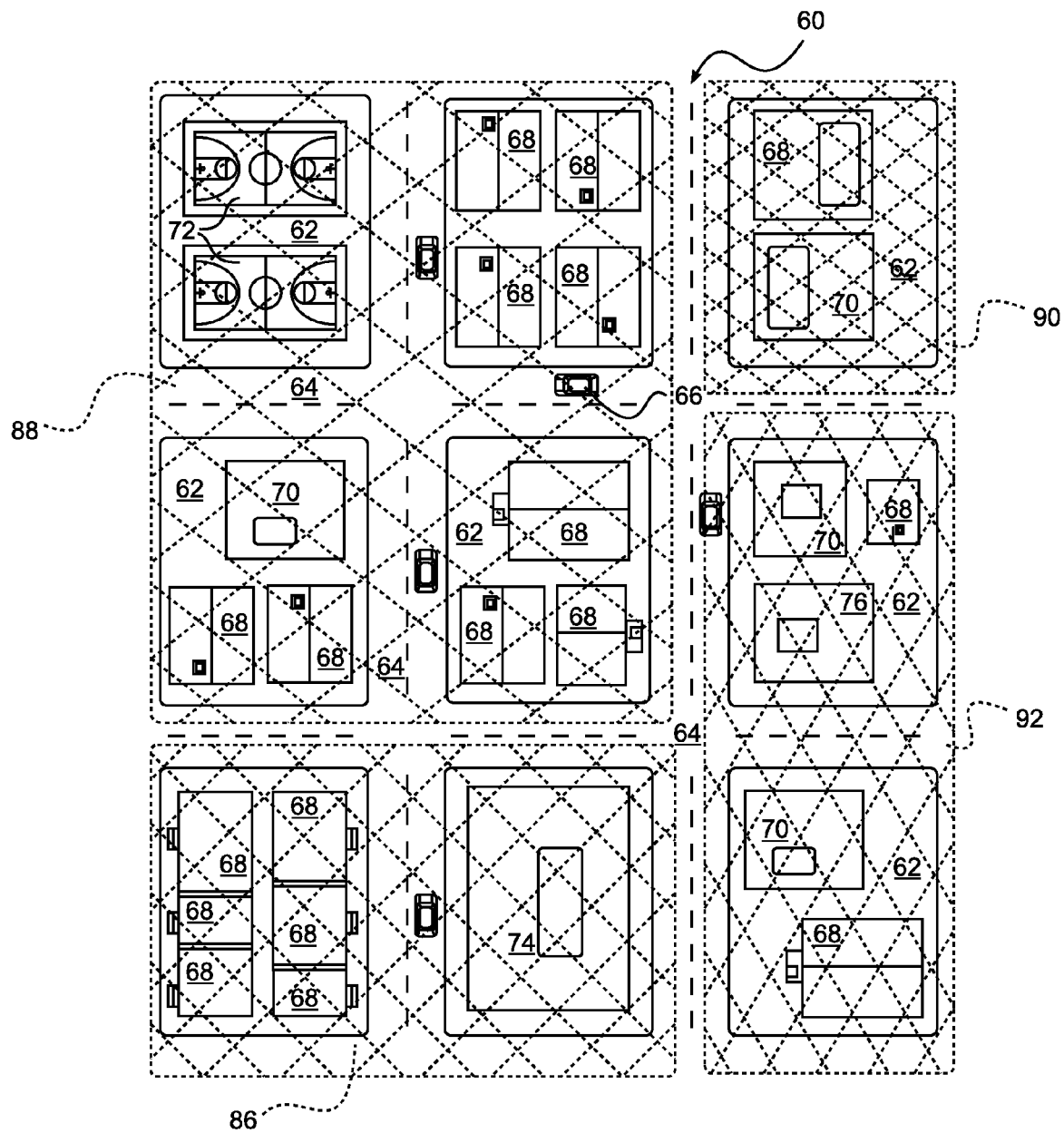

The mapping engine 20 is further preferably configured to divide a particular region into geographic areas of predetermined dimension and to determine a quality value for each of the geographic areas in the particular region based on indications of geographic areas received from contributing users through contributing user clients 30. For example, in the streetscape 60, the mapping engine 20 may determine a quality value for each of the city blocks 62 or each of the streets 64. Referring to FIG. 3, the mapping engine 20 may alternatively divide the streetscape 60 into neighborhoods 86, 88, 90, 92 and determine the quality value of each of the neighborhoods 86, 88, 90, 92. The management API 18 can receive an indication of a desired predetermined range of the quality value from an overseeing user through an overseer user client 32. The management API 18 can further transmit an indication to the overseeing user via the overseer user client 32 if the location information indicates that the subject user mobile device 40 has entered or exited, or alternatively failed to enter or exit, depending on a preference of the overseeing user, ones of the neighborhoods 86, 88, 90, 92 corresponding to a quality value falling within the indicated predetermined range. The management API 18 further transmits an indication to the subject user mobile device 40 and the overseer user client 32 of the quality values of each of the neighborhoods 86, 88, 90, 92 and an indication of which of the neighborhoods 86, 88, 90, 92 correspond to a quality value falling within the predetermined range.

Figure 4:
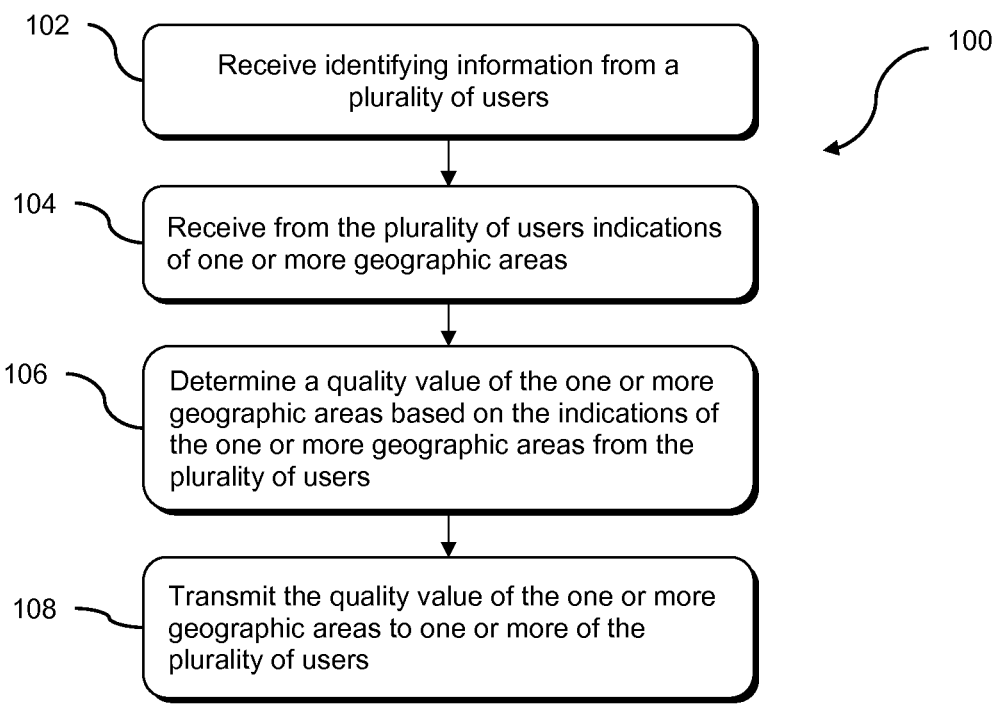
FIG. 4 is a flow chart showing a computer-implemented user contribution method according to a preferred embodiment of the present invention.

Referring to FIG. 4, a computer implemented user contribution method 100 according to a preferred embodiment of the present invention is shown. The method includes receiving identifying information from a plurality of users (step 102) and receiving from the plurality of users indications of one or more geographic areas (step 104). A quality value of the one or more geographic areas is determined based on the indications of one or more geographic areas from the plurality of users (step 106), and the quality value is transmitted to one or more of the plurality of users (step 108).

In another example implementation of the preferred system including location server 12, the location server 12 can track a subject user such as child and compare his or her location to a database of Points of Interest ("POIs") and Regions of Interest ("ROIs"). A POI is preferably a relatively small geographic area such as a house, a building, an indoor enclosure, or a well defined outdoor area. Referring to FIGS. 2 and 3, the structures including the homes 68, commercial establishments 70, playgrounds 72, school 74, and library 76 are POIs. A ROI is a larger geographic area such as a city block or neighborhood, for example the block 82 or neighborhood 86.

The quality value for a particular POI or ROI can be determined by the mapping engine 20, and the overseeing user can provide an indication of a predetermined range of the quality value and designate geographic areas having quality values determined to be within the predetermined range as non-allowable or allowable. Alternatively, an overseeing user can provide a direct indication via the management API 18 of whether a particular POI or ROI is allowable or non-allowable. A non-allowable area can correspond for example to an area deemed unsafe by an overseeing user. Alternatively, the location server 12 via the mapping engine 20 can set a particular area as allowable, non-allowable, safe or unsafe without regard to a predetermined range or other indication provided by an overseeing user.

If a subject user is determined to be at a POI or ROI that is designated as unallowable or unsafe via the mapping engine 20 the overseeing user is preferably immediately notified via the overseer user client 32. Notification can be provided from the location server 12 in the form of a text message, email or other suitable protocol to the overseer user client 32. For example, a parent overseeing user may designate select commercial establishments 70 (e.g. bars serving alcohol or tattoo parlors) as unsafe POIs for their underage child.

POIs/ROIs preferably fall under two categories:
Static—POIs/ROIs are determined from known databases for example databases stored on a remote mapping database server 42 accessible the to the location server 12 via a network connection. The location server 12 periodically updates POIs/ROIs via offline or out of band processes via contact with the remote mapping database server 42 or via other update procedure. However, during normal system operation, data corresponding to stored POIs/ROIs can remain static without real-time update.
Dynamic—POIs/ROIs are determined by the system substantially in real-time or near real-time, and POIs/ROIs can exist for a time period of less than an hour (e.g. 30 minutes) to infinite depending on system options.

The mapping engine 20 can determine if a subject user is at a POI or ROI based on various factors. For a POI, a radius boundary around the point is defined and if the subject user is within that radius then the subject user is determined to be at the POI. The boundary is either predefined or calculated from factors such as a type of POI, time of day, or other suitable criteria. For example, a commercial establishment such as a bar known to be frequented at night can correspond to a larger boundary at night time than during the day. Boundaries exceeding the actual footprint area of a particular POI are partly to account for inherent inaccuracies in location gathering. As location data becomes more accurate, for example it can be determined with a high degree of confidence whether someone is inside a building or walking near the building on the sidewalk, the defined boundaries can be made relatively smaller. An ROI is a boundary by definition and does not require an additional computation, although an ROI can be expanded or contracted to suit a particular preference.

In implementing static POIs and ROIs, the location server 12 offers a plurality of selectable POI/ROI categories to an overseer user client 32 via the management API 18. An overseeing user has the choice to subscribe to any or all of them. POI categories can include for example bars which serve alcoholic beverages, tattoo parlors, stores exclusively selling tobacco products, prisons, or other locations which might be considered objectionable to particular overseeing user. POI categories can further include listings in national or state public or private databases including listings of residences of sex offenders, pedophiles or other convicted criminals. POI/ROI categories can further be based on public or private crime statistics wherein POIs or ROIs having a predetermined measured level of criminal activity are designated as non-allowable or unsafe. The location server 12 can periodically access public or private databases hosted for example on a remote mapping database server 42 accessible to the location server 12 via a network connection.

In implementing dynamic POIs and ROIs, the location server 12 is configured to monitor various social networking application servers 44 to determine unsafe (e.g. objectionable) locations for example based on events occurring at the locations. The monitoring of social networking application servers 44 is preferably performed substantially continuously in real time or at relatively small time intervals such that new events connected to particular locations can be quickly analyzed for making a determination that a location is unsafe. For example, a recently developing wild, out-of-control party at a subject user's friend's house would not trigger a system using only static POIs/ROIs. However, by monitoring systems hosting Twitter™, Facebook™, Foursquare™, Buzz™, or other social networking applications for various keywords (e.g. drugs, sex, alcohol) the location server 12 can flag particular locations as unsafe. In addition, the location server 12 can use more complex natural language processing to determine the intent of the event and to filter out sarcastic events and detect more subtle suspicious clues. The location server 12 can further implement image processing to filter images gathered from a social networking application system 44 for items of interest (e.g. bottles of alcohol, cigarettes, etc.). Depending on the number of events and a predetermined level of severity associated with a particular event or corresponding data, the location server 12 grades the corresponding dynamic POI/ROI on its level of safeness. The location server 12 is a learning system that builds a database of users, events and locations, dynamically assigning risk levels to users, events and locations.

The location of an event identified via a social networking application server 44 or other remote system is an important factor in the creation of the dynamic POI/ROI. Events registered by social networking applications often include embedded location in the event updates, wherein the application server 44 can determine where a particular user is located when the user posts an event update. If embedded location is not found, other hints could be used to determine the location corresponding to an event. The location server 12 can analyze an embedded image through image processing for a telling clue regarding location of an event. The location server 12 can alternatively use natural language processing to reveal the location for example if a user posting regarding an event references the name or address of a location, or the user mentions "my home" and the user's home address is already known from previous data mining. As a learning system, the location server 12 preferably stores information gleaned from social networking systems or other systems in a learning database 24 to increase accuracy in analyzing future events.

If an event cannot be tied to a location, the event may still be important information. For example, if a user posts a suspicious event (e.g. including predetermined trigger key words or images) and posts a separate event immediately afterwards that would, by itself, not be flagged as suspicious but does contain a location, the location server 12 is configured to tie the two together wherein the initial event is associated with the location of the later event. Even in the case where it is not possible to tie a location to a suspicious event, the location server is configured to increase a risk level of the user which posts the suspicious event to better inform the system for future postings from that user, wherein for example a location associated with an event posting from a user having an elevated risk level is considered unsafe for a particular period of time regardless of whether any suspicious trigger information is included in the posting.

The location server 12 is configured to use the source of a posted event as a factor in determining whether a particular location is unsafe. A weighting can be added to location information from a particular source depending on the relation of the source to the subject user. For example, a Twitter™ tweet posted by the subject user would have a higher level of importance and associated weighting, warranting immediate attention, than a tweet from an unrelated party corresponding to a lower level of importance and associated weighting, which tweet can optionally be ignored by the location server 12 for purposes of determining location safety. In another example, a Facebook™ update from one of the subject user's "Facebook™ friends" or someone known to be a friend or acquaintance of the subject user would also have more importance than a Google™ Buzz from a stranger.

To obtain initial information on a subject user including his/her accounts on various social networks, his/her friends, or other identifying information, the location server 12 can rely on an overseeing user to provide that information through an overseer user client 32 via the management API 18. The location server 12 preferably maintains its own system oversight accounts on particular social networks, wherein an overseeing user can instruct the subject user to make the appropriate connection or connections to the particular oversight accounts. For example, the subject user can "friend" or "follow" the oversight accounts so that the location server 12 would have access to the subject user's more private information on particular social networks.

Dynamic POIs/ROIs with an unsafe status remain in unsafe status as long as events gathered from social networking application servers 44 continue to reinforce that the status of particular POIs/ROIs are unsafe. If the location server 12 ceases to receive suspicious events concerning a designated unsafe POI/ROI, the unsafe designation expires after a set period of time (e.g. 12 hours).

The location server 12 preferably employs a grading system for all POIs/ROIs and can notify an overseeing user in different ways or refrain from notifying depending on the severity of the overseeing users preferences, which preferences can be entered via the management API 18. For example, a subject user determined to be located near a tattoo parlor may trigger an email to the overseeing user, whereas a subject user determined to be located at a known pedophile's home may trigger an automated phone call to the overseeing user or one or more other persons.

Figure 5:
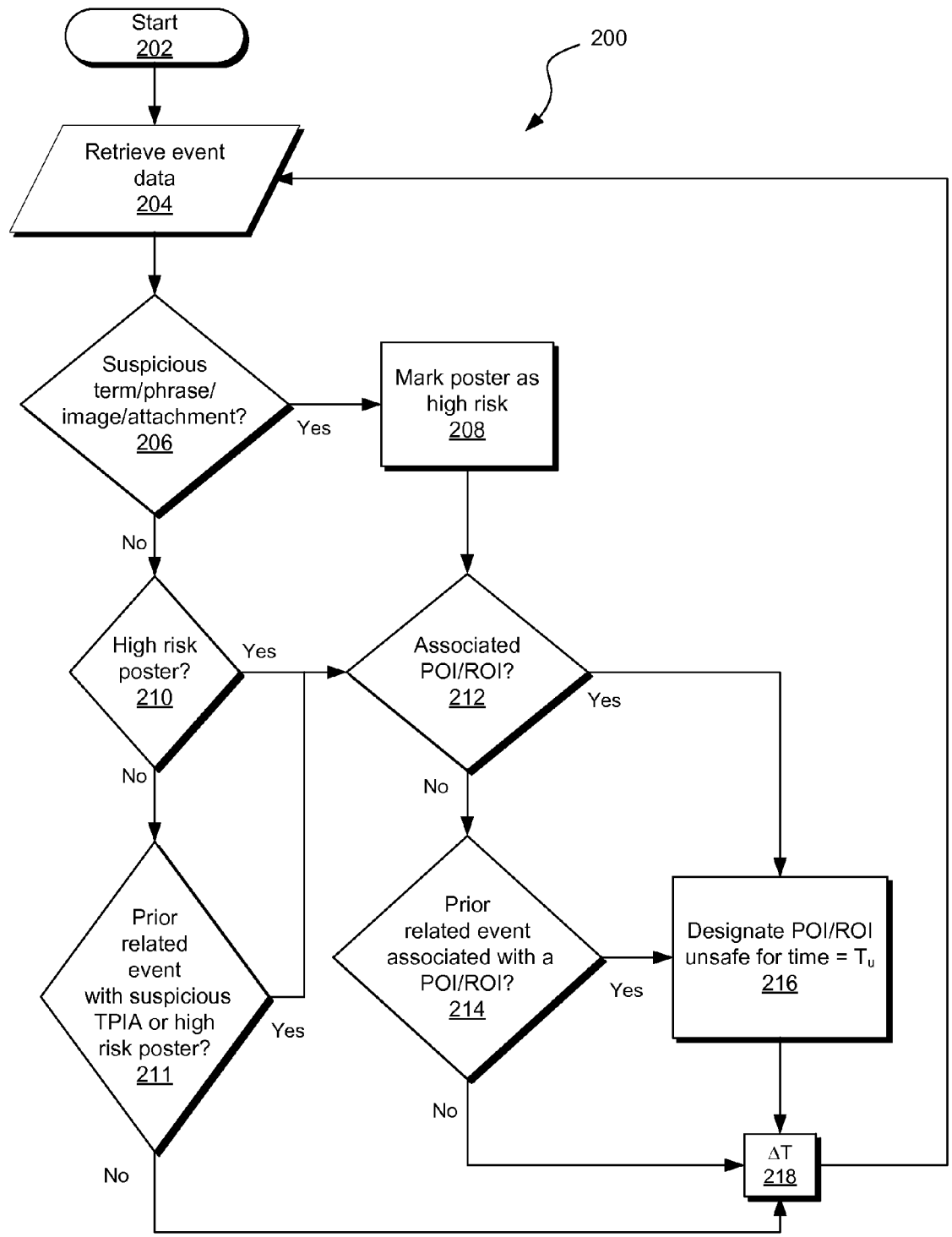
FIG. 5 is a process diagram depicting a method for dynamically identifying Points of Interest ("POIs") and Regions of Interest ("ROIs") according to a preferred embodiment of the invention.

Referring to FIG. 5, a process diagram is shown depicting a method 200 for dynamically identifying POIs and ROIs according to an illustrative embodiment of the invention. The process can be implemented by the location server 12 or other suitable system or systems. The method 200 starts at step 202. Event data is retrieved from an application server which enables posting of events by application users (step 204). The event data gathered preferably includes event data related to a subject user. The gathered event data can for example be limited to event data posted via a network-enabled social networking application used by the subject user. Gathered event data can further be limited to event postings by friends or contacts of the subject user within the particular social networking application or other social networking application, postings from users sharing identifying qualities with the subject user (e.g. going to the same school or being of a similar age), or postings from users located a predetermined distance from a location of the subject user or within a particular city or neighborhood of the subject user. Event data is compared with predetermined trigger data to determine if terms, phrases, images, file attachments ("TPIAs") and other event data is suspicious (step 206). If event data is determined to be suspicious, the poster of an event is designated as high risk for a predetermined period of time, for example a day, a week or a month (step 208). A particular poster can also be designated as high risk by input from a corresponding overseeing user, for example a parent overseeing who suspects one of her child subject user's friends is a dangerous influence can designate the friend as high risk. If event data is not determined to be suspicious, it is determined if the poster of the event is currently designated as high risk (step 210). If the poster of the event is not currently designated as high risk, data from one or more previously retrieved related events is compared with the trigger data to determine if terms, phrases, images, file attachments or other event data is suspicious (step 211). If the event data or prior related event data is determined to be suspicious or the poster had previously been marked as high risk, it is determined whether a POI/ROI is associated with the event (step 212), for example whether location is embedded in the event or language in the event explicitly indicates or implies a location. If a POI/ROI is not associated with the currently analyzed event, it is determined if a prior related event is associated with a POI/ROI (step 214). Related events can include for example events previously posted by the poster of the current event, or posted by a friend or other contact of the poster of the current event within a predetermined period of time of the posting of the current event. If a POI/ROI is associated with the event or a related event, the POI/ROI is designated as unsafe for a predetermined period of time $T_u$ (step 216). In designating an area safe or unsafe, a quality value of the POI/ROI is set. For example a quality value of 1 can be set for an unsafe POI/ROI and a quality value of 0 (zero) can be set for a safe POI/ROI. After a predetermined period of time $\Delta T$ 218 the process returns to step 204 to gather additional event data. An indication of unsafe areas corresponding to a subject user can be provided to an overseeing user. Moreover, when designated as unsafe, entrances to the POI/ROI by the subject user can trigger immediate or delayed notification to an overseeing user via electronic messaging or telephone.

It may desirable that event data be weighted differently depending on the source of the data, specifically based on a relationship status of the source of the data with the subject user, wherein event data postings from certain users have a greater propensity for triggering a designation that a POI/ROI is unsafe. Referring to FIG. 6, an example subject user relationship status weighting listing according to the invention is shown. A first tier 301 of the listing includes the subject user, wherein postings by the subject user are weighted the highest, 20. A second tier 302 corresponding to the second highest weighting, 10, includes friends and contacts of the subject user within a particular social networking application from which event data is retrieved or other social networking application. A third tier 303 corresponding to the third highest weighting, 7, includes friends/contacts of friends/contacts of the subject user within the particular social networking application or other social networking application. A fourth tier 304 corresponding to the fourth highest weighting, 5, includes individuals enrolled in the same school or employed by the same employer as the subject user. A fifth tier 305 corresponding to the fifth highest weighting, 3, includes individuals of similar age as the subject user living in the same neighborhood as the subject user. A sixth tier 306 corresponding to the lowest weighting, 1, includes individuals of similar age as the subject user living in the same city as the subject user. Weightings can be combined wherein an event posting corresponds to a higher weighting if the poster corresponds to more than one tier. For example a posting from a contact of the subject user (tier 2) of the same age as the subject user living in the same neighborhood as the subject (tier 5) corresponds to a combined weight of 10+3=13. Weights of postings from users currently designated as high risk can be increased by a multiplier, for example 1.5, to account for increased risk.

An overseeing user can further select preferred relationship statuses, wherein only postings from users corresponding to certain tiers include weights and the remaining postings have zero weights. For example, an overseeing user via the management API 18 can indicate that event posters corresponding to tiers 1-3, subject user 301, friends/contacts of the subject user 302, and friends/contacts of friends/contacts 303, include weighting and postings from users corresponding to tiers 4-6 have a zero weight. Enabling selection of tiers allows the system to be less sensitive and to designate less POIs/ROIs unsafe.

Figure 7:
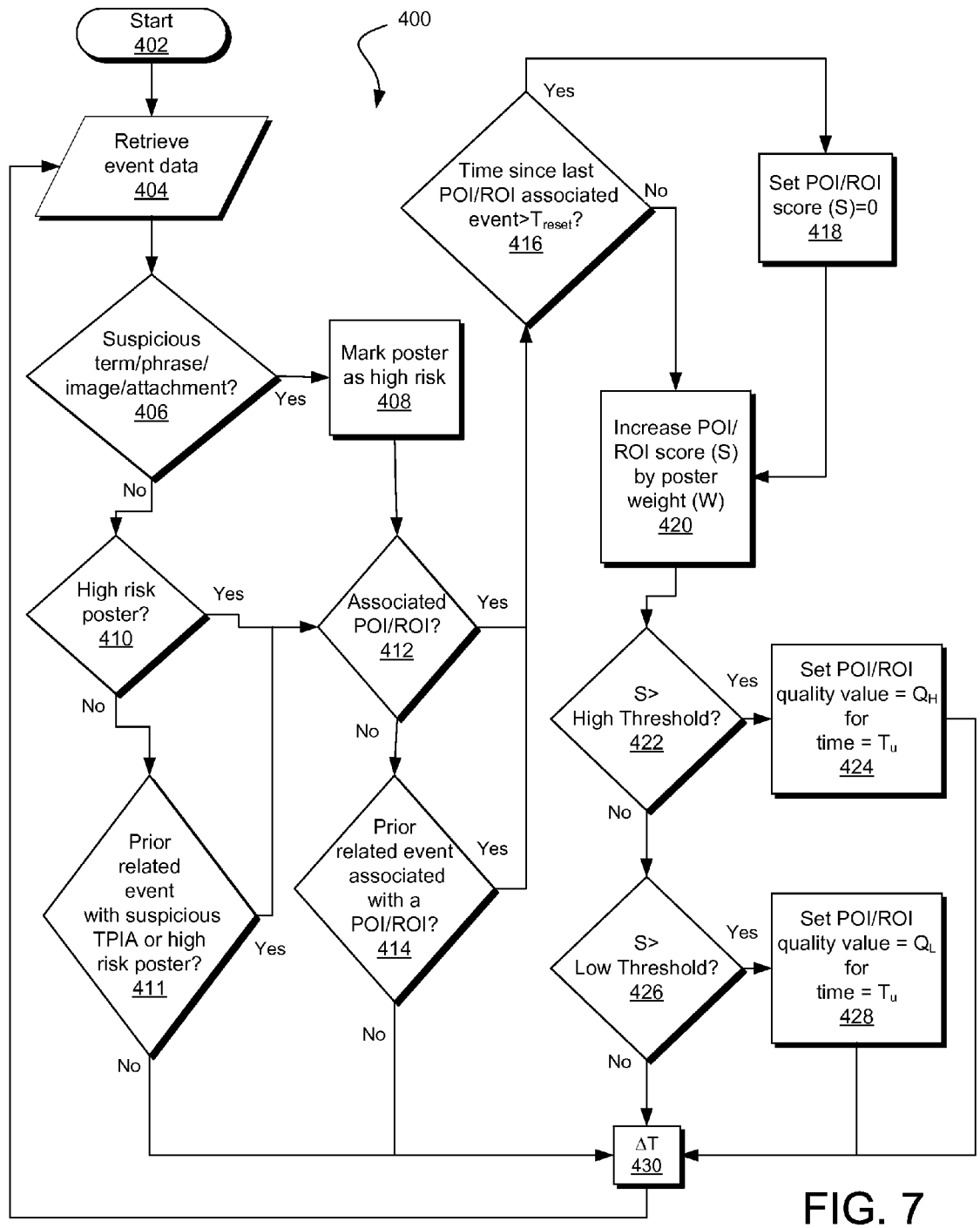
FIG. 7 is a process diagram depicting a method for dynamically identifying POIs and ROIs according to a preferred embodiment of the invention.

Referring to FIG. 7, a process diagram is shown depicting a method 400 for dynamically identifying POIs and ROIs and implementing an event weighting procedure according to an illustrative embodiment of the invention. The process can be implemented by the location server 12 or other suitable system or systems. The method 400 starts at step 402. Event data is retrieved from an application server enabling the posting of events by application users (step 404). The event data gathered preferably includes event data posted via a network-enabled social networking application by users related to the subject user and associated with a weighting, for example users of the types listed in FIG. 6. Event data is compared with predetermined trigger data to determine if terms, phrases, images, file attachments ("TPIAs") or other event data is suspicious (step 406). If event data is determined to be suspicious, the poster of an event is designated as high risk for a predetermined time period (step 408). If event data is not determined to be suspicious, it is determined if the poster of the event is currently designated as high risk (step 410). If the poster of the data is not designated as high risk, data from previously retrieved related events is compared with the trigger data to determine if terms, phrases, images, file attachments ("TPIAs") or other event data is suspicious (step 411). If the event data or prior related event data is determined to be suspicious or the poster is currently designated as high risk, it is determined whether a POI/ROI is associated with the event (step 412). If a POI/ROI is not associated with the currently analyzed event, it is determined if a prior related event is associated with a POI/ROI (step 414). Related events can include for example events previously posted by the poster of the current event, or posted by a friend or other contact of the poster of the current event within a predetermined period of time of the posting of the current event.

If a POI/ROI is associated with the event or a related event, it is determined in step 416 if the time from when an event was last associated with the particular POI/ROI in step 412 or 414 exceeds a preset reset time $T_{reset}$. If so, a score S corresponding to the POI/ROI is set to zero (step 418) and the process proceeds to step 420. If not, the process proceeds directly to step 420.

The POI/ROI score S is increased by the weight of the poster (step 420) of the currently analyzed event, for example a weight shown in FIG. 6. The score S can be further increased based on whether the poster is currently or was at a prior time designated as high risk. The score S can further be increased based on a type of trigger data found in the corresponding event posting. Trigger data is preferably weighted as shown for example in Table 1, wherein event postings including triggers with a higher weight will cause a greater increase in S. For example, if the weight of a poster of a currently analyzed event is 10 (Tier 302), a multiplier of 1.5 can be used if the poster is designated as high risk, and a multiplier of 2 can be used if the event includes mention of an illegal controlled substance such as cocaine, wherein the score S is increased by 10×1.5×2=30 based on an event posting mentioning cocaine by a high risk poster who is a contact.

The score S is compared with a high score threshold value (step 422), for example S=30, and a quality value of the POI/ROI is set to $Q_H$, for example $Q_H$=2, for a predetermined period of time $T_u$ (step 424) if the score S exceeds the high score threshold value. The value $Q_H$ is indicative of a highly unsafe POI/ROI. An overseeing user is preferably notified of highly unsafe POIs/ROIs prior to a corresponding subject user entering the POI/ROI. Notification can include relatively contemporaneous communication immediately after the determination that the POI/ROI is unsafe, for example in the form of a computer generated phone message, SMS, email or other digital communication. Alternatively, the overseeing user is notified by a relatively contemporaneous communication after the subject user enters the highly unsafe POI/ROI.

If the score S does not exceed the high score threshold value, S is compared with a low score threshold value (step 426), for example S=15, and a POI/ROI quality value is set to $Q_L$, for example $Q_L$=1, for a predetermined period of time $T_u$ (step 428) if the score S exceeds the low score threshold value. The quality value $Q_L$ is indicative of a normal unsafe POI/ROI which is ostensibly less unsafe than the highly unsafe POI/ROI indicated by the quality value $Q_H$. After a predetermined period of time ΔT 430 the process returns to step 404 to gather additional event data.

By system default or via selection by the overseeing user, predetermined quality value ranges can correspond to notification preferences. An overseeing user can be notified of determinations of normal unsafe POIs/ROIs corresponding to the quality value $Q_L$ with less urgency than determinations of highly unsafe POIs/ROIs corresponding to the quality value $Q_H$. For example the overseeing user can be notified in the form of a computer generated phone message, SMS, email or other digital communication only when the associated subject user has entered a normal unsafe POI/ROI, whereas the overseeing user can be notified of highly unsafe POIs/ROIs substantially immediately after generation of the quality value $Q_H$. Otherwise, the overseeing user can be notified for example once a day or once a week of normal unsafe POIs/ROIs which have not been entered.

Alternatively, the overseeing user can be notified of both normal unsafe POIs/ROIs and highly unsafe POIs/ROIs only when a subject user enters or arrives within a predetermined distance of a particular unsafe POI/ROI, but the overseeing user is notified with greater urgency if a particular POI/ROI is designated as highly unsafe. For example, a telephone call, text message and email is sent to the overseeing user substantially immediately upon a subject user entering or arriving within a predetermined distance of a highly unsafe POI/ROI, whereas the overseeing user is notified once a day of any and all entrances of the subject user to normal unsafe POIs/ROIs during a 24 hour period. In other words, for a POI/ROI with a quality value greater than 0 (i.e. $Q_L$ or $Q_H$), an overseeing user can be notified of subject user entrances to the POI/ROI on a daily basis, and for a POI/ROI with a quality value greater than 1 (i.e. $Q_H$), the overseeing user can be notified immediately upon subject user entrance to the POI/ROI.

Figure 8:
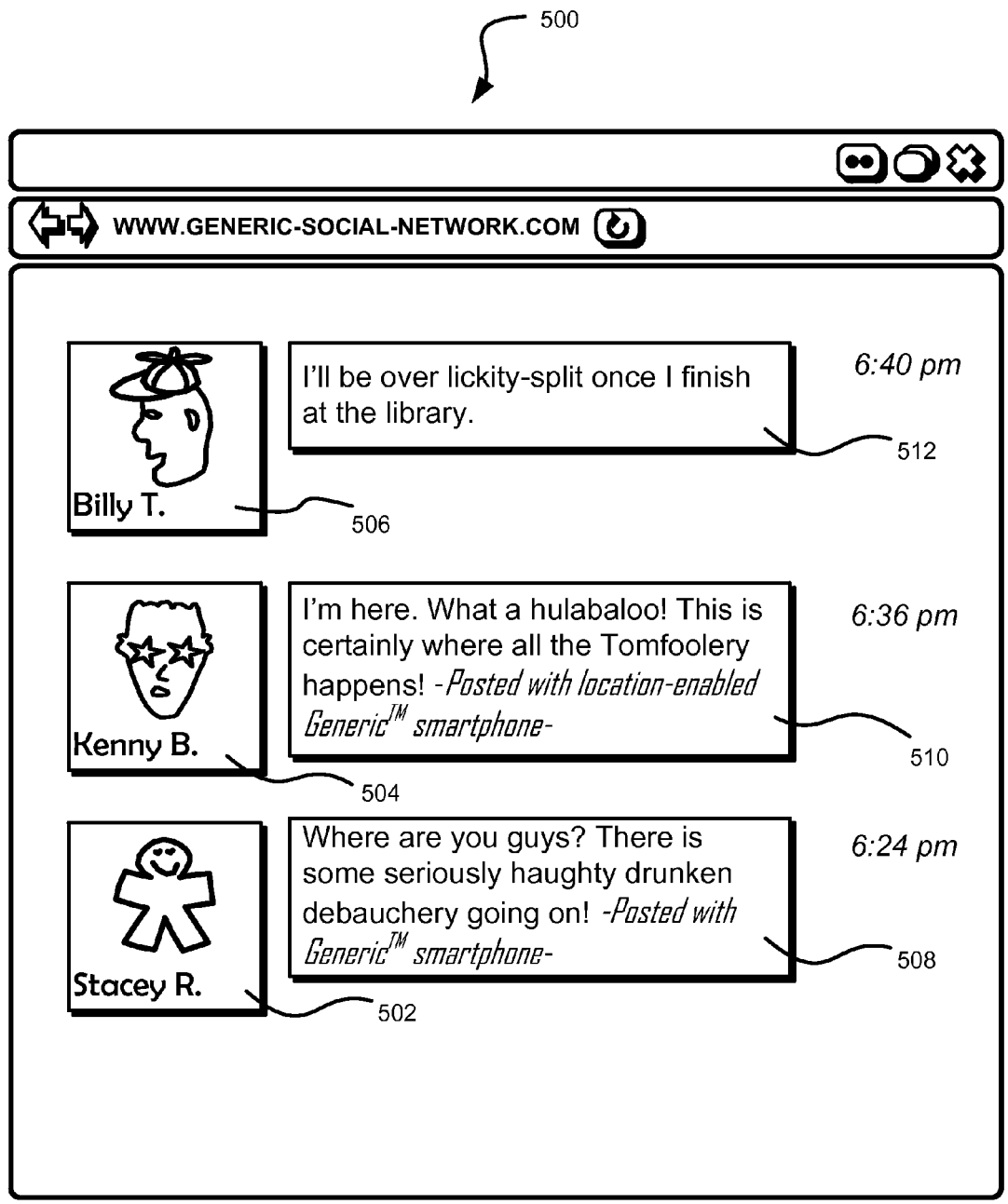
FIG. 8 shows an example browser interface to illustrate the implementation of methods according to the invention.

Referring to FIG. 8, an example browser interface 500 is shown for the purpose of demonstrating the method 400 shown in FIG. 7. Referring also to FIG. 1, the browser interface 500 can be enabled for example by a social networking application server 44, permitting social networking application users Stacey R. 502, Kenny B. 504, and Billy T. 506 to use a hosted social networking application at "WWW.GENERIC-SOCIAL-NETWORK.COM" via their clients 46 such as personal computers, smart phones or other network connectable devices. At 6:24 pm, 6:36 pm and 6:40 pm Stacey R. 502, Kenny B. 504, and Billy T. 506 respectively post events 508, 510, 512. Stacy R. 502 posted her event 508 with a smart phone client 46, but no location information is embedded with the post. Kenny B. posted his event 510 with a location enabled smart phone client 46 which associated location information with the event 510 in the form of embedded location data. Billy T. posted his event 512 with a client 46 in the form of a public computer at his school library, and no location information is associated with the event 512. Billy T. is an adolescent subject user who is subject to oversight by his mother, the corresponding overseeing user. Billy's mother provided authentication information for Billy's various social networking application accounts including WWW.GENERIC-SOCIAL-NETWORK.COM via the management API 18 to permit access to non-public event data posted by Billy's friends and contacts. The location server 12 implementing the method 400 first retrieves a 6:24 pm event posting 508 corresponding to Stacey R. (step 404). The language is compared to a list of suspicious terms for example as listed in Table 1 below (step 406). For brevity, many terms have been omitted from Table 1, but one skilled in the art would know other potentially suspicious terms, including colloquial, vulgar and offensive terms, may be included in such listing. Stacey R. is marked as high risk for one week (step 408) since the word "drunken" in her event posting matches with "drunk" in the list below. It is determined that no POI/ROI is associated with event posting 508 or a prior related event (steps 412 and 414), so the process returns to step 404 and a 6:36 pm event posting 510 corresponding to Kenny B. is retrieved.

TABLE 1

|    | Term      | Weight |
|----|-----------|--------|
| 1  | Sex       | 1      |
| 2  | Alcohol   | 1      |
| 3  | Beer      | 1      |
| 4  | Wine      | 1      |
| 5  | Vodka     | 1      |
| 6  | Gin       | 1      |
| 7  | Rum       | 1      |
| 8  | Drugs     | 2      |
| 9  | Cocaine   | 2      |
| 10 | Heroin    | 2      |
| 11 | Marijuana | 2      |
| 12 | Drunk     | 1      |
| 13 | Police    | 2      |
| 14 | Arrest    | 2      |
| 15 | Fight     | 1      |
| 16 | Gun       | 2      |

It is determined that no suspicious term/phrase/image/attachment corresponds to event posting 510 (step 406) and Kenny B. is not a high risk poster (step 410). However, it is determined that a stored prior related event posting 508, which is related at least by virtue of being near in time to posting 510, includes a suspicious term as indicated above (step 411), so the process proceeds to step 412 where it is determined that Kenny's event posting 510 includes embedded location provided via his "location-enabled Generic™ smartphone" used to generated the event posting 510. The embedded location indicates a POI as an address corresponding to Stacey's house. In this example, the last time a POI/ROI was associated with Stacey's house was three months prior. $T_{reset}$ in this example is one month, so the POI/ROI score for Stacey's house is set to zero (steps 416 and 418), and referring to FIG. 6, the POI/ROI score is increased from zero to 10 since Kenny is Billy's friend/contact (step 420). Referring to steps 422, 426, and 428, the score S=10 is lower than the high score threshold, which in this example is 25, but higher than the low score threshold, which in this example is 5. Accordingly, the quality value for Stacey's house is set to $Q_L$, and the process returns to step 404.

Billy's mother can select via the management API 18 whether and under what circumstance she wants to be notified of POIs/ROIs designated as having quality $Q_L$. In this example, Billy's mother selects to be notified once a day of any and all ROIs/POIs having their quality values set to $Q_L$ during a corresponding 24 hour period, wherein the location server 12 sends a status email message to Billy's mother via her corresponding client 32, for example her home personal computer, that Stacey's house was designated as normal unsafe during the preceding 24 hour period.

Returning to step 404, a 6:40 pm event posting 512 is generated by Billy using a computer at a public library. It is determined that no suspicious term/phrase/image/attachment corresponds to event posting 512 (step 406) and Billy is not a high risk poster (step 410). Optionally, the subject user can be precluded from ever being designated as a high risk poster. Since it is determined in step 411 that the stored prior related event posting 508 by Stacey includes a suspicious term, the process proceeds to step 412 where it is determined that Billy's posting does not include embedded location. The process proceeds to step 414 where it is determined that the stored prior related event posting 510 by Kenney is associated with a POI/ROI (Stacey's House). Referring to steps 416 and

420, the time since Stacey's house was last associated with an event (the time between Billy's post and Kenny's post) is 4 minutes, which is less than $T_{reset}$, so the POI/ROI score S for Stacey's house is increased by the tier 1 weight value, 20, corresponding to the subject user to a total score S of 10+20=30. Referring to steps 422 and 424, the POI/ROI score S, 30, is greater than the high score threshold of 25, so the quality value of Stacey's house is set to $Q_H$, and the process returns to step 404.

Billy's mother can select via the management API 18 whether and under what circumstance she wants to be notified of POIs/ROIs designated as having quality $Q_H$. In this example, Billy's mother selects to be notified immediately whenever an ROI/POI has its quality value set to $Q_H$, wherein the location server 12 sends an email and text message to Billy's mother via her corresponding client 32, for example her smartphone, that Stacey's house is currently designated as highly unsafe.

Static POIs/ROIs can also correspond to quality values $Q_H$ and $Q_L$. For example residences corresponding to convicted sex offenders can be designated with a quality value of $Q_H$, whereas establishments serving alcohol can be designated with a quality value of $Q_L$. Quality values of static POIs/ROIs remain unchanged prior to an update of corresponding mapping data which preferably occurs at predefined time intervals.

While the preferred embodiments of the invention have been described in detail above, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A computer-implemented user contribution method comprising:
   retrieving event data posted by a plurality of users related to a first user, the event data comprising indications of at least one geographic area;
   comparing the event data with predetermined trigger data;
   determining a quality value of the at least one geographic area based on the comparison of the event data with predetermined trigger data; and
   transmitting an indication of the quality value of the at least one geographic area to a second user.

2. The computer-implemented user contribution method of claim 1, further comprising:
   retrieving identifying information of the plurality of users comprising indications of relationship statuses between the first user and the plurality of users; and
   determining the quality value further based on the relationship status between the first user and at least one of the plurality of users.

3. The computer-implemented user contribution method of claim 2, further comprising:
   receiving from the second user an indication of at least one preferred user relationship status; and
   determining the quality value of the at least one geographic area based on the event data from at least one of the plurality of users corresponding to the at least one preferred user relationship status.

4. The computer-implemented user contribution method of claim 1, wherein the indication of the quality value comprises an indication that the at least one geographic area is unsafe if the event data corresponds to the predetermined trigger data, the method further comprising transmitting the indication that the at least one geographic area is unsafe to the second user responsive to determining the event data corresponds to the predetermined trigger data.

5. The computer-implemented user contribution method of claim 1, wherein the quality value corresponds to an indication that the at least one geographic area is unsafe, the method further comprising transmitting the indication that the at least one geographic area is unsafe responsive to:
   determining the event data corresponds to the predetermined trigger data; and
   receiving mobile device location information of a user mobile device corresponding to the first user indicating that the user mobile device has entered the at least one geographic area.

6. The computer-implemented user contribution method of claim 1, wherein the event data comprises a plurality of event postings, the method further comprising:
   generating a score for the at least one geographic area responsive to at least one event posting corresponding to the predetermined trigger data and associated with the at least one geographic area; and
   determining the quality value of the at least one geographic area responsive to the score exceeding a predetermined threshold.

7. The computer-implemented user contribution method of claim 6, the method further comprising increasing the score for the at least one geographic area responsive to the at least one event posting:
   including the predetermined trigger data;
   originating from a poster user who previously generated an event posting including the predetermined trigger data; and
   being posted within a predetermined time period of a prior posting including the predetermined trigger data.

8. The computer-implemented user contribution method of claim 6, the method further comprising increasing the score for the at least one geographic area responsive to the at least one event posting originating from a particular one of the plurality of users who previously generated an event post including the predetermined trigger data, wherein the increase in score is based on a relationship status between the first user and the particular one of the plurality of users.

9. The computer-implemented user contribution method of claim 6, the method further comprising:
   increasing the score for the at least one geographic area responsive to a second event posting originating from a particular one of the plurality of users, which second event posting does not indicate the at least one geographic area comprising the predetermined trigger data; wherein
   the second event posting is generated within a predetermined period of time after a first event posting, which first event posting indicates the at least one geographic area.

10. The computer-implemented user contribution method of claim 9, wherein the increase in score is based on the relationship status between the first user and the particular one of the plurality of users.

11. The computer-implemented user contribution method of claim 6, the method further comprising:
   increasing the score for the at least one geographic area responsive to a second event posting originating from a particular one of the plurality of users, which second event posting indicates the at least one geographic area, and which second event posting does not comprise the predetermined trigger data; wherein
   the second event posting is generated within a predetermined period of time after a first event posting which comprises the predetermined trigger data and which does not indicate the at least one geographic area.

12. The computer-implemented user contribution method of claim 11, wherein the increase in score is based on the relationship status between the first user and the particular one of the plurality of users.

13. The computer-implemented user contribution method of claim 1, further comprising:
   comparing the quality value of the at least one geographic area with a predetermined range and determining whether the quality value falls within the predetermined range; and
   transmitting an indication of the quality value of the at least one geographic area to the second user if the quality value of the at least one geographic area falls within the predetermined range.

14. The computer-implemented user contribution method of claim 13, wherein:
   the quality value is either a first value corresponding to safe or a second value corresponding to unsafe; and
   the predetermined range is defined as values not equal to the first value, wherein a determination that the quality value equals the second value triggers transmission of an indication to the second user that the at least one geographic area is unsafe.

15. The computer-implemented user contribution method of claim 1, further comprising:
   comparing the quality value of the at least one geographic area with a predetermined range and determining whether the quality value falls within a first predetermined range and determining whether the quality value falls within a second predetermined range;
   transmitting at a first predetermined frequency an indication of the quality value of the at least one geographic area to the second user if the quality value of the at least one geographic area falls within the first predetermined range; and
   transmitting at a second predetermined frequency an indication of the quality value of the at least one geographic area to the second user if the quality value of the at least one geographic area falls within the second predetermined range.

16. The computer-implemented user contribution method of claim 15, wherein a first quality value corresponds to a safe geographic area, a second quality value corresponds to a normal unsafe geographic area, and a third quality value corresponds to a highly unsafe geographic area, and wherein the first predetermined range comprises the second and third quality values and the second predetermined range comprises the third quality value but not the second quality value.

17. The computer-implemented user contribution method of claim 15, wherein first predetermined frequency is at least one of daily, weekly and monthly, and the second predetermined frequency is substantially immediately upon a determination that the at least one geographic area falls within the second predetermined range.

18. The computer-implemented user contribution method of claim 1, further comprising:
   comparing the quality value of the at least one geographic area with a predetermined range and determining whether the quality value falls within the predetermined range;
   receiving mobile device location information of a user mobile device corresponding to the first user from at least one of the user mobile device and a remote telecommunication carrier server in communication with the user mobile device indicating that the user mobile device has entered the at least one geographic area; and
   transmitting an indication to the second user that the user mobile device has entered the at least one geographic area if the quality value of the at least one geographic area falls within the predetermined range.

19. The computer-implemented user contribution method of claim 1, further comprising:
   receiving an indication of a predetermined range from the second user;
   comparing the quality value of the at least one geographic area with the predetermined range and determining whether the quality value falls within the predetermined range;
   receiving mobile device location information of a user mobile device corresponding to the first user from at least one of the user mobile device and a remote telecommunication carrier server in communication with the user mobile device indicating that the user mobile device has at least one of entered and exited the at least one geographic area; and
   transmitting an indication to the second user that the user mobile device has at least one of entered and exited the at least one geographic area if the quality value of the at least one geographic area falls within the predetermined range.

20. The computer-implemented user contribution method of claim 1, further comprising:
   receiving from the second user an indication of a predetermined range;
   comparing the quality value with the predetermined range and determining whether the quality value falls within the predetermined range;
   receiving mobile device location information of a user mobile device corresponding to the first user from at least one of the user mobile device and a remote telecommunication carrier server in communication with the user mobile device;
   transmitting a warning to the second user if the location information indicates that the user mobile device has entered the at least one geographic area and if the quality value of the at least one geographic area falls within the predetermined range; and
   transmitting a map to the user mobile device displaying the at least one geographic area and displaying whether the area is allowable if the quality value of the at least one geographic area falls within the predetermined range.

21. The computer-implemented user contribution method of claim 1, further comprising:
   receiving from the second user an indication of a predetermined range;
   comparing the quality value with the predetermined range and determining whether the quality value falls within the predetermined range;
   receiving mobile device location information of a user mobile device from at least one of the user mobile device and a remote telecommunication carrier server in communication with the user mobile device; and
   transmitting a warning to the user mobile device if the location information indicates that the user mobile device has entered the at least one geographic area and if the quality value of the at least one geographic area falls within the predetermined range.

22. The computer-implemented user contribution method of claim 1, further comprising:

comparing the quality value with a predetermined range and determining whether the quality value falls within the predetermined range;

receiving mobile device location information of a user mobile device corresponding to the first user from at least one of the user mobile device and a remote telecommunication carrier server in communication with the user mobile device;

transmitting a map to the user mobile device displaying the at least one geographic area and displaying whether the quality value of the at least one geographic area falls within the predetermined range; and transmitting an indication to the second user that the user mobile device has at least one of entered and exited the at least one geographic area if the quality value of the at least one geographic area falls within the predetermined range.

23. The computer-implemented user contribution method of claim 1, further comprising:

comparing the quality value with a predetermined range and determining whether the quality value falls within the predetermined range;

receiving mobile device location information of a user mobile device corresponding to the first user from at least one of the user mobile device and a remote telecommunication carrier server in communication with the user mobile device;

transmitting a map to the user mobile device displaying the at least one geographic area and displaying whether the quality value of the at least one geographic area falls within the predetermined range; and transmitting an indication of a reward to the user mobile device if the quality value of the at least one geographic area falls within the predetermined range and if the location information indicates that the user mobile device has not entered the at least one geographic area during a predetermined time period.

24. The computer-implemented user contribution method of claim 1, wherein retrieving the event data comprises retrieving an event posting with embedded location data.

25. The computer-implemented user contribution method of claim 1, wherein retrieving the event data comprises retrieving an event posting with location data in the body of the posting.

26. The computer-implemented user contribution method of claim 1, further comprising transmitting through a computer network a map to at least one of the first user and the second user displaying the at least one geographic area and an indication of the quality value of the at least one geographic area in relation to a surrounding area.

27. The computer-implemented user contribution method of claim 26, wherein the indication of the quality value comprises an indication of whether the at least one geographic area is safe or unsafe.

28. The computer-implemented user contribution method of claim 1, wherein retrieving the event data comprises retrieving event data posted via a social networking application by the plurality of users.

29. The computer-implemented user contribution method of claim 1, wherein the predetermined trigger data comprises at least one of predetermined text data and predetermined image data.

30. The computer-implemented user contribution method of claim 1, comprising:

assigning a risk level to at least one of the plurality of users based on the event data posted by the at least one of the plurality of users; and determining the quality value of the at least one geographic area based on the risk level of the at least one of the plurality of users.

31. The computer-implemented user contribution method of claim 1, wherein the event data comprises a plurality of event postings and the trigger data comprises a plurality of weighted triggers, the method further comprising determining the quality value of the at least one geographic area based on a weight of at least one of the plurality of triggers in at least one of the plurality of event postings.

32. A user contribution based mapping system comprising at least one computing device including at least one memory comprising instructions operable to enable the computing device to perform a procedure comprising:

retrieving event data posted by a plurality of users related to a first user, the event data comprising indications of at least one geographic area;

retrieving identifying information of the plurality of users comprising indications of relationship statuses between the first user and the plurality of users;

comparing the event data with predetermined trigger data;

determining a quality value of the at least one geographic area based on the comparison of the event data with predetermined trigger data and based on the relationship status between the first user and at least one of the plurality of users; and transmitting an indication of the quality value of the at least one geographic area to a second user.

33. The user contribution based mapping system of claim 32, wherein the at least one memory further comprises instructions operable to enable transmitting the indication of the quality value as an indication that the at least one geographic area is unsafe responsive to a determination the first user has entered or exited the at least one geographic area.

* * * * *